United States Patent
Fan et al.

(10) Patent No.: US 7,022,073 B2
(45) Date of Patent: Apr. 4, 2006

(54) BORDER DETECTION FOR MEDICAL IMAGING

(75) Inventors: Liexiang Fan, Issaquah, WA (US); Patrick L. Von Behren, Bellevue, WA (US); Thilaka S. Sumanaweera, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 293 days.

(21) Appl. No.: 10/405,136

(22) Filed: Apr. 2, 2003

(65) Prior Publication Data

US 2004/0197015 A1 Oct. 7, 2004

(51) Int. Cl.
    *A61B 8/00* (2006.01)

(52) U.S. Cl. ........................................ 600/437; 600/443

(58) Field of Classification Search ......... 600/407–472; 382/199; 73/625, 626; 367/7, 11, 130, 138; 128/916
See application file for complete search history.

(56) References Cited

U.S. PATENT DOCUMENTS

| | | | |
|---|---|---|---|
| 6,337,925 B1 * | 1/2002 | Cohen et al. | ................ 382/199 |
| 6,364,835 B1 | 4/2002 | Hossack et al. | |
| 6,443,894 B1 | 9/2002 | Sumanaweera et al. | |
| 6,475,149 B1 | 11/2002 | Sumanaweera | |
| 6,482,161 B1 | 11/2002 | Sumanaweera et al. | |
| 6,503,202 B1 | 1/2003 | Hossack et al. | |
| 6,708,055 B1 * | 3/2004 | Geiser et al. | ............... 600/425 |

* cited by examiner

*Primary Examiner*—Ali Imam

(57) ABSTRACT

Methods and systems for detecting a border in a medical image are provided. A boundary is chosen as a connected curve whose tangent is substantially perpendicular to the gradient of the image everywhere along the curve. As an alternative to a tangent, a normal or other border direction may be used. At a given point within the image, the tangent to the boundary and the image gradient direction are orthogonal. Using an initial boundary detection, the boundary associated with the minimum cost or associated with the closest boundary where the boundary tangent and the image gradient directional are orthogonal for locations along the boundary is identified. By refining an initial border location to minimize divergence from the boundary tangent being orthogonal to the image gradient direction or by identifying a border based on the orthogonal relationship, accurate border detection may be provided in ultrasound images as well as other medical images.

23 Claims, 2 Drawing Sheets

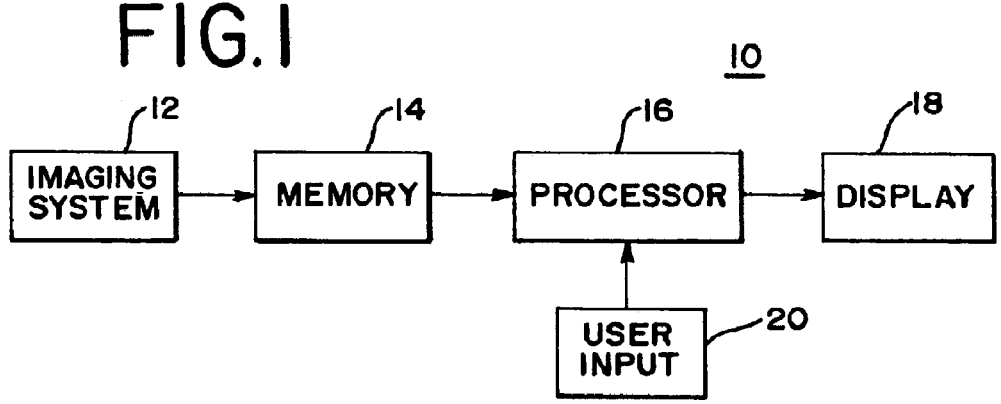
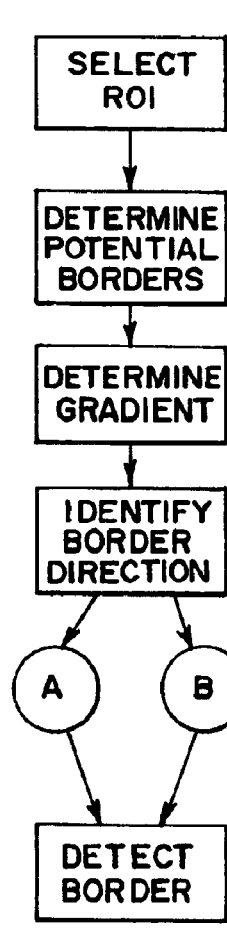
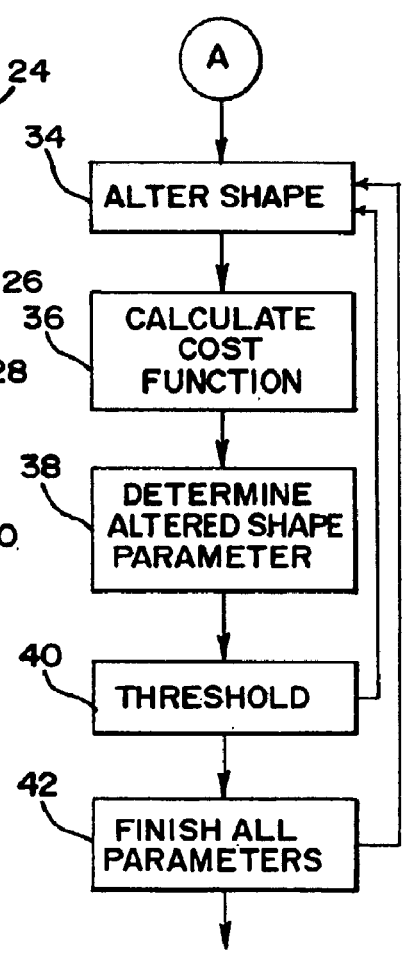
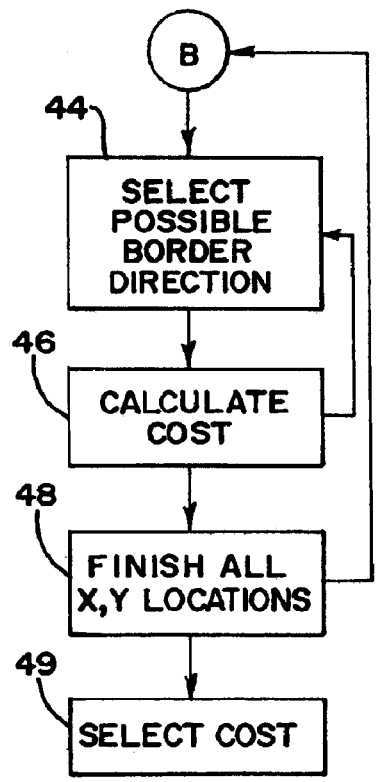

BORDER DETECTION FOR MEDICAL IMAGING

BACKGROUND

The present invention relates to border detection in medical imaging. For example, vessel borders are detected in medical ultrasound images to determine a vessel width, an intima-media thickness (IMT), the inner or outer boundary of the fetal head, the edge of a bone, heart ventricle, a cyst, or any object imaged that has a distinguishable gradient in the neighborhood of the boundary.

For objective analysis of medical images, the borders of the vessels are detected. In one embodiment, a user inputs the border, such as using a touch screen, track ball or mouse to draw the border based on a displayed image. Automatic or processor based border detection is provided in other embodiments. For example, the intensity of the images is thresholded to identify locations of the vessel wall as opposed to locations within the vessel. As another example, certain identified locations along a border may be used for a curved fitting calculation to represent the border.

One type of algorithm for edge detection is based on Marr's theory. The zero-crossing of the second derivative of the image signals corresponds to the edge of the objects. A filter removes the noise in the image. The second derivative of the filtered image is determined. The zero crossing a points of the second derivative image are identified as potential border pixels. Combining these three steps together, a Marr's theory based edge is defined as the zero-crossings of the Laplacian of the Gaussian operator (i.e., the Gaussian function behaves as a low pass filter) applied to the image for various values of sigma, the standard deviation of the Gaussian function. Whenever no ambiguous connections between independently detected edges are possible, these connected edges determine the boundary.

Another type of algorithm for edge detection is Canny edge detection. Canny edge detection is based on the extreme of the first derivative of the Gaussian operator applied to the image for various values of sigma, the standard deviation of the Gaussian function. Canny methods use two thresholds to link edge points. These edge points are the identified potential boundary points and, when there are no local extremes only the absolute extreme is detected and that is the boundary.

Yet another type of algorithm for edge detection in a deformable model and active contour (e.g., a snake model). The deformable model is a spline or surface with controlled continuity. The energy terms control movement of the points in the model. These energy terms include the internal (i.e., continuity of the model), the external (i.e., image information such as image gradient), and some other constraints set by the operators. By minimizing the energy (usually called cost function), the final position of the contour is defined. This contour is the defined boundary.

Another type of algorithm is the level set method. The level set method treats the active contour as the zero level set of a higher dimensional surface. The entire surface evolves to minimize a metric defined by the image gradient and curvature.

One accepted method for determining a boundary in medical imaging is the deformable model. The essence of this method is to build a cost function and evolve an initial boundary to the final boundary associated with the minimum cost value. Unfortunately, the terms developed for the cost function are more or less subjective.

However, these automatic techniques may have difficulty due to speckle content or other noise within an ultrasound image. Also, an automatic method may be limited to specific types of imaging situations, such as only detecting a border where a cross section or only where a longitudinal view of the vessel is available. Obtaining a specific one of longitudinal or cross-sectional views of particular vessels may be difficult due to limited acoustic windows into the body.

BRIEF SUMMARY

The present invention is defined by the following claims, and nothing in this section should be taken as a limitation on those claims. By way of introduction, the preferred embodiments described below include methods and systems for detecting a border in a medical image. The method unifies the region growing, automated identification of region of interest, and boundary detection methods. A boundary is chosen to be a connected curve whose tangent is substantially or about perpendicular to the gradient of the image content everywhere along the curve. As an alternative to a tangent, a normal or other border direction may be used. At a given point within the image, the tangent to the boundary and the image gradient direction are substantially orthogonal. Using an initial boundary detection, the boundary associated with the minimum cost or associated with the closest boundary where the boundary tangent and the image gradient directional are substantially orthogonal for locations along the boundary is identified. By refining an initial border location to minimize divergence from the boundary tangent being orthogonal to the image gradient direction or by identifying a border based on the orthogonal relationship, accurate border detection may be provided in ultrasound images as well as other medical images.

The boundary detection can also expanded to surface detection, such as the surface of the vessel, or heart, or heart chamber, or fetal head, or any surface that has a distinguishable gradient in the neighborhood of the boundary. For the purposes of this specification, borders or boundaries are n-dimensional.

In a first aspect, a method for detecting a border in a medical image is provided. A gradient direction is determined for each of a plurality of locations in an image. A border direction relative to the gradient direction is identified for a plurality of locations. The border is detected as connected locations of the plurality of locations. The detection is a function of the gradient direction and the border direction.

In a second aspect, another method for detecting a border in a medical image is provided. A gradient is determined from a plurality of locations in the image. At least a line segment is identified where the tangent to the line segment is substantially perpendicular to a direction of the gradient for each location of the plurality of locations along the line segment.

In a third aspect, a system for detecting a border in a medical image is provided. The system includes a memory operable to store the medical image. A processor is operable to determine a gradient direction for each of a plurality of locations in the image, identify a border direction relative to the gradient direction for the plurality of locations, and detect the border as connected locations. The detection is a function of the gradient direction and the border direction.

In a fourth aspect, a gradient direction is determined for each of a plurality of locations in an image. Any method for detecting a collection of potential border pixels in a medical image is used. A collection of potential borders is identified using the collection of potential border pixels. This could be all possible boundaries passing through the collection of potential borders, but preferred is the use of physical limitations on the particular border type or heuristic constraints to limit the total number of possible boundaries. The border is detected as a function of the image gradient direction and the potential borders. In the preferred embodiment, the detected border is the potential border which minimizes a cost function of the tangent to the border and the gradient.

Further aspects and advantages of the invention are discussed below in conjunction with the preferred embodiments.

BRIEF DESCRIPTION OF THE DRAWINGS

The components in the figures are not necessarily to scale. Emphasis instead being placed upon illustrating the principles of the invention. Moreover, in the figures, like reference numerals designate corresponding parts throughout the different views.

FIG. 1 is a block diagram of one embodiment of a system for detecting borders in medical images;

FIGS. 2A–C are flow chart diagrams of embodiments of methods for detecting a border in a medical image;

DETAILED DESCRIPTION OF THE DRAWINGS AND PRESENTLY PREFERRED EMBODIMENTS

Figure 3:
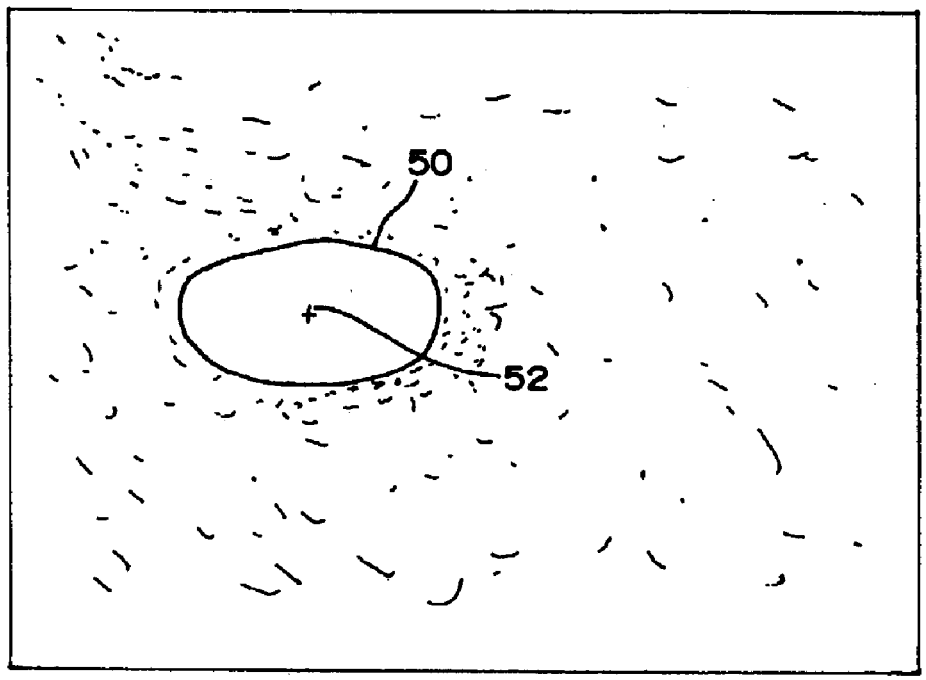
FIG. 3 is a graphical representation of one embodiment of a medical image with the cross sectional view of vessel structure.

A boundary is chosen such that the boundary is the connected curve or line segment whose tangent ($\vec{T}_{curve}$) is substantially perpendicular to the image gradient ($\vec{G}_{image}$) everywhere along the line segment or curve. For a closed form representation of curve or line, $\vec{T}_{curve}$ can be computed directly from as the derivatives of the curve along the spatial coordinate directions. The image gradient, $\vec{G}_{image}$, (also referred to herein as the gradient of an image) is the derivatives of the image intensity along the spatial coordinate directions. In other cases, $\vec{T}_{curve}$ is computed using the coordinate values of discrete points. The direction of the image gradient is usually normalized to have the norm as 1. In this descriptions, the uses of image gradient direction and the image gradient are interchangeable for simplicity. In alternative embodiments, a normal or other boundary direction relationship is used.

For an enclosed or cross-sectional view of a vessel, such as the brachial artery, an ellipse or other geometrical shape is fitted within the interior of the vessel. The parameters defining the ellipse or other geometrical shape are then optimized based on the image gradient direction, tangents to the ellipse or other geometrical shape, and other factors including the magnitude of the image gradient and/or other original and derived image features as well. The minor axis of the ellipse or other geometrical shape then represents the distance across the vessel. For real-time imaging, the values of the parameters defining the ellipse in a previous image are applied in each subsequent image and then optimized. The diameter of the vessel is the minor axis in each image and the functionality of the vessel indicated by the vessel diameter is a function of time.

As an example for a longitudinal view of the vessel, the image gradient information and possible tangents for each location within a region are used to determine a line segment border. The lumen-intima boundary and the media-adventitia boundary are determined in a single region of interest. Other cross-sectional or longitudinal view examples may be used.

The geometrical relationship between the image gradient direction and the border direction provides a quick and robust way to identify tissue to tissue or tissue to fluid interfaces for ultrasound or other medical imaging. By using a geometric property of the boundary and knowledge of the approximate shape of the vessel, but not necessarily size, orientation or location of the vessel, minimal input is provided by the user for automatic detection of boundaries. For example, the user indicates the general application, such as cross-sectional or longitudinal view imaging and identifies a point in an area of interest. Boundary detection may be provided for organ tissues or other non-vessel objects as well.

FIG. 1 shows one embodiment of a system 10 for detecting a border in a medical image. The system 10 includes an imaging system 12, a memory 14, a processor 16, a display 18 and a user input . In one embodiment, the system 10 comprises an ultrasound imaging system, such as an imaging system manufactured by Siemens Medical Solutions USA, Inc. Ultrasound systems by other manufacturers may be used. The memory 14, processor 16, display 18 and user input are part of the ultrasound imaging system. In alternative embodiments, one, more or all of the memory 14, processor 16, display 18 and user input are separate from the imaging system 12, such as being a computer or a workstation connected through one or more networks or memory transfer devices to the imaging system 12. For example, the memory 14, processor 16, display 18 and user input are a personal computer, medical imaging workstation or other device for processing medical images separate from, remote from, or adjacent to the imaging system 12.

The imaging system 12 or the system 10 is an ultrasound system in one embodiment. Other embodiments are computed tomography, magnetic resonance, X-ray or other medical imaging systems. The imaging system 12 generates one or more medical images in any of various formats.

The memory 14 comprises a random access memory, a hard drive, a diskette, a compact disk, a videocassette, a server memory, network memory, cache memory, CINE memory or other now known or later developed memory device. The memory 14 is operable to store one or more medical images, such as ultrasound images of a vessel.

The processor 16 is a general processor, digital signal processor, application specific integrated circuit, control processor, digital circuit, analog circuit, combinations thereof or other now known or later developed devices for processing data. In one embodiment, the processor 16 comprises a digital signal processor and a high pass filter. The processor 16 is operable to determine a gradient direction for each of a plurality of locations in an image. For example, the processor 16 image processes to identify gradients from the medical image stored in the memory 14. As another example, a high-pass filter generates the gradient information, and the processor 16 identifies the direction of gradients for any particular location within the image. The processor 16 is also operable to identify a border direction relative to the gradient direction for a plurality of locations in an image. The processor 16 detects the border as a series of connected image locations or pixels where the detection is a function of the image gradient direction and a border direction. In one embodiment, the processor 16 minimizes a cost function as a function of the image gradient direction and a border direction for each of the plurality of locations and selects the border as connected locations corresponding to the minimum cost. In an offline embodiment, the borders are detected at any of various speeds. For real-time imaging, the borders may be detected in real-time using lookup tables for the search direction or sine and cosine base calculation of the search direction. Border detection may be provided at 30 frames per second or faster. In alternative embodiments, slower calculations are performed.

In one embodiment, the processor 16 receives inputs from the user input 20. For example, signals from the user input 20 identify a region or location of interest within an image. The processor 16 generates an initial boundary in response to the user input with the user input device 20. For example, the processor 16 receives a user indicated boundary or applies an algorithm for identifying an initial boundary. The processor 16 is also responsive to the user input 20 for identification of the geometric form or general type of image. For example, the user selects an endothelial application, indicating a closed geometric form of a cross-sectional view of a vessel. As another example, the user selects an IMT measurement application, indicating a longitudinal vessel view. Alternatively, the user merely inputs the type of view for border detection, indicating either a closed geometric form or identification of a line without connected ends (i.e., open form). In yet other alternative embodiments, the processor 16 processes the image data to identify a likely border.

The user input device 20 comprises a trackball, mouse, touch screen, pointer device, touch pad, keyboard, buttons, slides, switches, knobs or other now known or later developed input devices. In one embodiment, the user input 20 is a user interface on either the imaging system 12 or a personal computer.

The display 18 is a CRT, LCD, flat panel, projection, plasma screen, or other now known or later developed display device. The display 18 is operable to display the medical images with or without detected border information. For example, the display 18 displays a medical image with a highlighted overlay representing the border detected by the processor 16.

FIG. 2A shows a method of one embodiment for detecting a border in a medical image. The method includes two different approaches depending on whether a closed form or an open form border is detected, as represented by selections A of FIG. 2B and selection B of FIG. 2C. Different, additional, or fewer acts may be provided in alternative embodiments.

A collection of potential border pixels or locations is identified, such as the entire image or a sub-set of the image. For example, in act 24, a region of interest is selected. In one embodiment, the processor 16 receives an indication of a region of interest. For example, the user selects a point within a vessel or an area within or around the vessel or other object of interest. In alternative embodiments, the processor 16 automatically determines a region of interest based on an image characteristic, such as an area of low intensity values. The region of interest includes image locations associated with just one type of signal, a generally similar intensity level, or signals associated with different intensity values. The region of interest is of specific size, such as representing a region of the patient that is 1 cm×½ cm, but other sizes may be used. Alternatively, the region of interest is selected based on additional information, such as a determination of an initial boundary in act 26 based on the user selection of a point or other location. For example, the selected region of interest is adjusted in size and/or shape to enclose an initial boundary, to be at the initial boundary, or to include tissue or other structure information inside and outside of an initial boundary.

A collection of potential borders is identified using the collection of potential border pixels. This could be all possible boundaries passing through the collection of potential borders, but physical limitations on the particular border type or heuristic constraints may be used to limit the total number of possible boundaries. For example, one or more potential or initial boundaries are determined in act 26 alone or in combination with either of refining a border in act 38 or selecting possible borders for act 44.

In act 26, an initial boundary is determined. In one embodiment, the initial boundary is determined as a function of the image intensities and the user indication of a region of interest. For example, the user indicates a particular location in an image. Using a region growing algorithm, the intensity of pixels adjacent to the selected pixel or the current region are compared to a threshold. If the pixel intensity is above a threshold, an initial boundary location is identified. If the pixel intensity is below the threshold, the process continues to a next adjacent pixel until an initial boundary is located in a given direction. The region is grown in all directions to identify a closed form, such as a vessel boundary in a cross-sectional image. For identifying an open form or a line segment border, the process continues in a user indicated direction or in a direction associated with the closest identified pixel over the threshold to the starting pixel. A line segment of a particular length, such as 1 cm relative to the object is then identified. In alternative embodiments, multiple initial borders are identified. By applying a region growing algorithm to obtain the initial or potential boundary, extensive computation can be avoided. Region growing may be less sensitive to spike noise.

In additional embodiments, the initial boundary is further refined. For example, a geometric shape is fitted within or generally over the initial boundary determined by region growing for a closed form. An ellipse or circle with the same number of black or flow pixels as the region grown initial border is selected as the initial geometric shape. Alternatively, the user indicates three different locations on the vessel wall and a circle or ellipse which passes through the three points is used as the initial boundary. Alternatively, curve fitting using all the initial boundary points or identification of the two closest border locations on opposite sides of the region grown border as the minor axes of an ellipse and the distance between two locations around the 90 degree axis as a major axis of the ellipse is used. The ellipse or other geometric form is then used as the initial boundary. For example, an ellipse is parameterized as:

$$x = x_0 + a \cos(\alpha)\cos(\theta) - b\sin(\alpha)\sin(\theta),$$

$$y = y_0 + a \sin(\alpha)\cos(\theta) + b\cos(\alpha)\sin(\theta),$$

where $x_0$ and $y_0$ identify the center of the ellipse, a is a major axis of the ellipse, b is the minor axis of the ellipse, $\alpha$ is the angle of the ellipse in the image plane and $\theta$ represents a position on the edge of the ellipse. When the above example is used, the values of $[x_0, y_0, a, b, \alpha]$ obtained from the curve fitting procedure are set as the initial parameter set $p_0 = [x_0, y_0, a, b, \alpha]$. Other techniques may be used for curve fitting a geometric shape to the boundary identified using region growing or other boundary detection technique. In yet other alternative embodiments, additional curve fitting is not performed and the initial boundary identified using region growing or other now known or later developed border detection techniques is the initial boundary.

In yet another additional embodiment, the initial boundary is determined as a line segment or an open form. For example, region growing is used to identify one or more line segments. A region of interest is then adjusted to enclose the line segment, such as translating and rotating the region of interest. For example, a 1 cm×½ cm region of interest is translated and rotated to enclose a 1 cm long line segment. Larger or smaller line segments and/or regions of interest may be used. In additional embodiments, multiple line segments are identified and different or the same regions of interest are used to enclose the multiple regions of interest. For an open form or line segment border, the initial boundary is determined and the region of interest is selected based on the initial boundary. For a closed form, the region of interest is identified as the initial boundary or the initial boundary is identified as within a previously selected region of interest. Any of various combinations of selecting the region of interest and determining an initial boundary using different algorithms in different orders may be used.

In act 28, the gradient of the medical image is determined. For example, the image data is spatially high-pass filtered. Any filter size or pixel window for a one-, two- or three-dimensional high-pass filter may be used. Infinite impulse response or finite impulse response filters may be used. In alternative embodiments, a processor or other circuit calculates the first derivative of the medical image for various spatial locations. Other techniques for determining a image gradient now known or later developed may be used.

In one embodiment, gradients are determined for an entire image. Alternatively, gradients are determined just for the initial border, the region of interest, a given region around the initial border or other portion of the medical image.

The gradient directions are determined from the gradient information. For example, the two-dimensional directional gradient vector associated with each pixel or other location along the initial border or within a region of interest is determined. In one embodiment, the direction associated with the largest magnitude of gradient around a particular pixel is selected as the gradient direction for that pixel. Alternatively, a statistical analysis or other function is used to determine the gradient direction at a particular location based on surrounding gradient values.

In act 30, a border direction relative to the image gradient direction is identified for a plurality of locations. The border direction is identified for the initial border, image locations within the region of interest, or other image locations. In one embodiment, the border direction is identified as a tangent to the image gradient direction at each of the plurality of locations. The tangent is determined as a function of the geometrical shape for an enclosed initial border or as a function of the line segment for an open form initial border. The tangent is a line perpendicular to the direction of the image gradient for each location of the plurality of locations along the line segment. Multiple possible tangents for any given location may be determined. In alternative embodiments, the border direction used is a normal to a surface or other directional indication.

The initial boundary is refined as a function of the image gradient direction and the possible border directions. The identification of the border directions and detection of the border of acts 30 and 32 may be performed simultaneously, part of a same function or calculation or separately. In one embodiment, the tangent of the border is computed either using the parameterized closed form presenting the border or using the discrete points of the border. The border is defined at locations where the tangent of the initial boundary or a tangent of a previous boundary is perpendicular with the image gradient direction. For example, the cross product of the tangent vector to a curve or boundary with the image gradient direction is minimized to approach a zero value. The minimum cost function is calculated for each of the plurality of locations. The minimum cost function is a function of the tangent at the location and the direction of the image gradient for the same location. By minimizing the cost function as a function of the image gradient direction and the border direction for each of a plurality of locations within a region along an initial boundary or other locations, a more accurate border is detected. The perpendicular relationship of the tangent of the boundary and the image gradient direction is approached by minimizing the cost function.

FIG. 2B shows branch A from FIG. 2A for identifying a border direction and detecting a border using a closed geometric shape in one embodiment. For example, the medical image includes a cross-sectional view of a vessel. FIG. 3 is a graphical representation of a cross-sectional view of a vessel. The ellipse 50 represents an initial boundary, a subsequently calculated boundary or a minimum cost boundary. The cross-hairs 52 represent a selection by the user identifying a location within a desired region for analysis. For example, the ellipse 50 represents an initial boundary determined for calculating a width of a vessel for endothelial function measurement. The image gradient direction is determined for each of a plurality of locations along an edge of the geometric shape approximating the cross-sectional vessel. Any of various geometric shapes may be used, such as an ellipsoid. The border direction is then identified as the tangent to the geometric shape at each of the plurality of locations along the edge. The border is detected as a function of the initial boundary.

In act 34, the geometric shape is altered as the iteration evolves. In the example of ellipse shape, the parameter set $[x_0, y_0, a, b, \alpha]$ are altered to identify an ellipse corresponding to the minimum cost. Any of various combinations of altering the parameters may be used, such as altering the $x_0$ and $y_0$ values to identify a minimum cost, and then altering the a and b axis values based on the previously identified $x_0$ and $y_0$ values, and finally altering the $\alpha$ value. Any groupings of the parameters and orders of searching and identifying parameters associated with the minimum cost function may be used. A iterative process involving changes in all of the parameter values may be used in yet other embodiments. The change of the parameters of the geometric shape results in an update of the tangent values of each point in the shape.

In act 36, the cost function is calculated based on the currently selected parameter values for the geometrical shape. The cost function is responsive to both the image gradient direction and the tangent for any given location x, y on the geometrical shape. In a generic form of the cost function, the cost C can be represented as, $C=E+D$ where E can be any proper cost terms used in existing or later developed deformable model methods. For instance, E is the second derivative of the image corresponding to the Marr's theory, the first derivative corresponding to Canny's method, or any other derived values of the image. The D term represents the orthogonal property of the image gradient and the tangent of the boundary. One instance of the cost function is given by $C=-\int_\theta |G(x,y)|d\theta + D$, where $|G(x,y)|$ is the magnitude of image gradient and D is $\int |\vec{T}_{curve} \times \vec{G}_{image}| d\theta = 0$ in an ideal situation. The cross product of the tangent vector with the image gradient direction approaches 0 as the tangent becomes more perpendicular to the image gradient direction. By integrating over all values of θ, the cost associated with the geometric shape for the various x and y locations along the geometric shape is determined. Other cost functions may be used, for example the negative sign in front of the magnitude of gradient integral is removed to identify a maximum cost.

In act 38, a search is performed to determine an alteration or change in one or more of the geometric shape parameters, such as one of the parameters discussed above for an ellipse. In one embodiment, one or more of the parameters are incremented or decremented. In another embodiment, a search direction is mathematically calculated to determine the different parameter for the geometric shape. For example, the search direction $\vec{s}$ is given by:

$$\vec{s} = -\begin{bmatrix} \oint_\theta I(x, y)\cos(\theta + \alpha)d\theta \\ \oint_\theta I(x, y)\sin(\theta + \alpha)d\theta \\ \oint_\theta I(x, y)|\cos(\theta + \alpha)|d\theta \\ \oint_\theta I(x, y)|\sin(\theta + \alpha)|d\theta \\ \oint_\theta I(x, y)\text{Sgn}(\sin(2(\theta - \alpha))d\theta \end{bmatrix}$$

where I(x, y) is the image intensity and the uppermost to lowermost equations are used to determine an altered parameter value of x0, y0, a, b and α, respectively. A different parameter is determined for the geometric shape as a function of the image intensity or image values along the geometric shape. By calculating a search direction for one or more of the parameter values, the number of iterative steps needed to minimize the cost function may be reduced. Other functions for identifying a search direction or altering the shape parameter may be used.

In act 40, thresholding is applied to determine whether to move on to altering the geometric shape for the parameters. For example, the absolute value of the cost function is less than 0.001 or another value, the absolute value of one of the parameter changes is less than 0.0001 or another value, or the number of iterations approaches 50 or other values. The current parameter values are the final value. In alternative embodiments, the results of the cost function calculation in act 36 are compared to a threshold to determine whether to continue to alter one or more parameters.

In act 42, the process is checked to determine whether all of the parameters have been completed. If an additional parameter is to be adjusted, the process returns to act 34. For each different parameter or different set of parameters, a cost is calculated in act 36 and an alteration of one or more parameters is determined in act 38. After the comparison with the threshold in act 40 determines a final parameter, any additional parameters are altered and the process repeated. Once all the parameters have been identified as final, the resulting geometric shape represents a minimum cost or a best fit geometric shape for the vessel or other region of interest. The geometric relationship of the border direction and the image gradient direction identifies the best fit. The final geometric shape is selected from the various geometric shapes. The geometric shape with parameters corresponding to a minimum cost is selected.

The minor axis of the ellipse represents a width of the vessel or width of other structure. Where the angular relationship between the scanned plane and vessel is known, the major axis may also be used to calculate a width. An ellipse was used in the example above, but other geometric shapes may be used. Likewise, the cost function included a tangent term, but other border direction indicators, such as a normal, may be used. By including a search determination, a number of iterations is used to minimize the cost function to identify the final geometric shape or minimum cost. The final geometric shape is the detected border.

Figure 4:
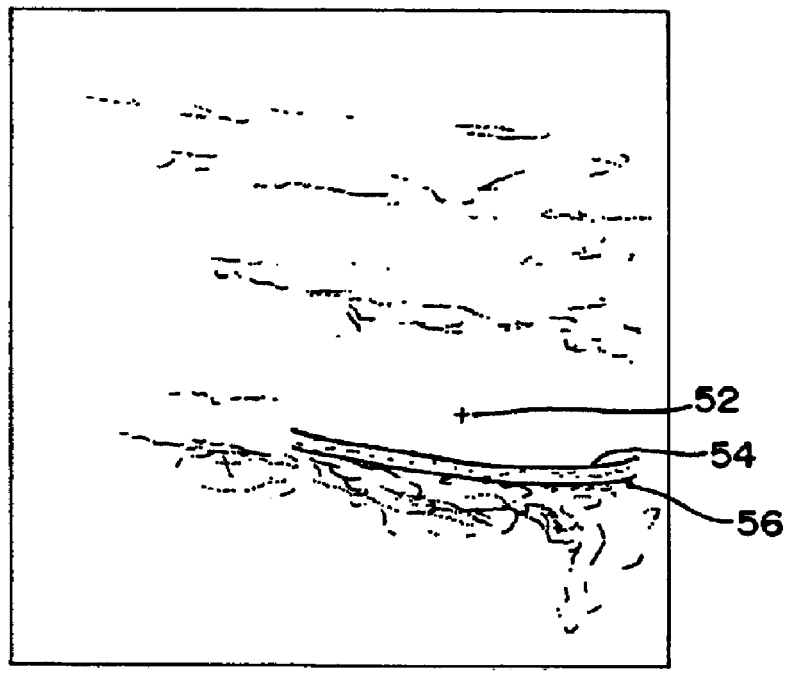
FIG. 4 is a graphical representation of one embodiment of a medical image with a longitudinal or open view of a vessel.

FIG. 2C shows identification of the border direction and detection of the border of acts 30 and 32 for an open form or a line segment. For example, FIG. 4 shows two line segment borders 54 and 56 for an lumen-intima boundary and media-adventitia boundary respectively. The image of FIG. 4 shows a longitudinal view of a vessel. The borders 54 and 56 are generally associated with a gradient change from a bright reflective tissue to a somewhat reflective tissue and finally to a lesser reflective fluid, such as blood in a vessel, respectively.

Referring to FIG. 2C, the image gradient direction is determined for each of a plurality of locations within a region of interest selected to enclose the initial boundaries or line segments 54 and 56, such as a 1 cm×0.5 cm region of interest. A single initial border or line segments associated with other object may be used, and/or different, additional or fewer acts may be performed.

In act 44, a possible or potential border consisting of connected pixels is selected. Rather than using a geometric shape, the border is considered as a free form line segment. In one embodiment, a discrete variable r is introduced to represent a direction that all the locations in the border can project onto it. In some implementations, the range of the line segment in r is fixed. For example, in the interest of measurement, only one centimeter of the vessel is used. When the horizontal direction (x) of the image is used as r, then x is within a certain range, for instance, [100, 300] in pixel unit. Corresponding to the variable θ as the closed form position variable, the border search in the open form is spanned in r. The dynamic programming method is most suitable to search the minimum cost function associated with variable r. Other methods can be used to minimize the cost function. The DP sums all the cost for each location. For each location, the tangent is estimated by using the neighboring pixels along the border. For each possible border, a cost is calculated in act 46. For example, the cost function can be modified into $$C = -\sum_r |G(x, y)| + D_i.$$

Rather than using an integral, the cost function is the sum of magnitude of image gradient for the x, y location plus the cross product of the image gradient direction throughout the range variable r. Acts 44 and 46 are repeated for each of the possible border associated with a given location. The dynamic programming (DP) method is carried out for each location on the border.

In act 48, the x, y or both values are incremented or decremented. The process repeats until the possible costs have been calculated for each of the locations within a region of interest.

In act 49, the minimum cost associated with each location within the region of interest is selected. The border direction for each of the plurality of locations within the region of interest is identified by the selections. The border direction is a function of possible cost calculations (i.e., the plurality of possible border directions for each location). The border is selected from this two-dimensioned matrix of minimum costs. The combination of connected locations or line segment with the minimum cost is used as the border.

Referring to FIG. 2A, the border is detected in act 32. The border is detected as connected locations within the image as a function of the image gradient direction and the border direction. For the closed form example above, the border is detected as the final closed form associated with the minimum cost function. The tangents of the closed form shape are most perpendicular to the image gradient direction along the border. For the open form example above, the border is detected as a line segment of connected or adjacent locations with a minimum of the cost function. Other algorithms may be used for selecting adjacent or connected locations associated with the minimum cost function. In one embodiment, the location associated with the minimum cost is selected. Two adjacent locations associated with the minimum cost of surrounding locations are then selected. For each end of the line segment being formed, another adjacent location with the minimum cost is selected as a connected location. The process repeats to form the line segment or detected border. In one embodiment, the process is repeated for a second border. In this embodiment, a check is performed to assure that the borders do not cross. Alternatively, the regions of interest are defined to not overlap and separately contain different borders.

In one embodiment, a border is detected in three dimensions. The detection is a function of a image gradient and a normal to a surface. Since the normal is used as the border direction rather than a tangent, the cross product of the normal with the image gradient in a three-dimensional space approaches a one value for a desired border. Similar cost functions and three-dimensional integrations are used to determine a desired three-dimensional border. For example, a cylindrical approximation is used in a closed form. Alternatively, a surface is detected as an open form. The image data used for a three-dimensional volume comprises a plurality of image planes reconstructed into a three-dimensional volume. The border is detected at connected locations on a surface of the three-dimensional geometrical shape based on the normal to the surface and image gradient directions at each of a plurality of locations within the three-dimensional volume. Other border directions than the normal may be used in alternative embodiments.

The above described processes identify a border in a given image. For a sequence of images, each border is identified separately in each sequential image. Alternatively, the parameters or border identified in a previous image are used as the initial boundary for each subsequent image. The thickness between two borders, such as for the IMT, the diameter of a vessel or other quantity calculated as a function of the detected border is displayed overtime in one embodiment. For example, endothelial function measurements typically occur over a period of time as a vessel is dilated. The vessel diameter is displayed over time. The maximum diameter occurring, the time to reach the maximum diameter, the percent of change of the diameter over time compared with the a base line diameter or other derived matrix indicating endothelial dysfunction are calculated and displayed. While endothelial function analysis has been described above using a closed form, a diameter measurements may be obtained using different line segments in an open form border detection based on a longitudinal view of the vessel.

While the invention has been described above by reference to various embodiments, it should be understood that many changes and modifications can be made without departing from the scope of the invention. For example, various mathematical relationships, cost functions, search direction calculations, or other algorithms may be used for detecting a border based on a border direction and an image gradient direction. Any of various geometric shapes, closed forms, and/or open forms may be used.

It is therefore intended that the foregoing detailed description be understood as illustrative rather than limiting, and that it be understood that it is the following claims, including all equivalents, that are intended to define the spirit and scope of this invention.

We claim:

1. A method for detecting a border in a medical image, the method comprising:
   (a) determining a gradient direction for each of plurality of locations in the medical image;
   (b) identifying potential border pixels;
   (c) determining a set of potential borders as a function of connecting locations of the potential border pixels; and
   (d) detecting the border, the detecting being a function of the gradient direction and the set of potential borders.

2. The method of claim 1 wherein the function of (d) is a minimization of a cost function dependent on the gradient and a normal to the border.

3. The method of claim 2 wherein the cost function is computed only over selected ones of the potential borders that are predicted to have decreasing costs.

4. The method of claim 1 wherein (a) comprises determining the gradient direction for each of the plurality of locations in a three-dimensional volume, the image associated with one of a plane within the volume and a rendering of the volume, (d) comprises determining a normal to a surface at each of the plurality of locations, and (e) comprises detecting the border as connected locations based on the normal and gradient direction at each of the plurality of locations.

5. A method for detecting a border in a medical image, the method comprising:
   (a) determining a gradient direction for each of a plurality of locations in the image;
   (b) detecting an initial boundary;
   (c) identifying a border direction on the initial boundary, the border direction relative to the gradient direction for the plurality of locations; and
   (d) detecting the border as connected locations of the plurality of locations, the detecting being a function of the gradient direction and the border direction.

6. The method of claim 5 wherein (c) comprises identifying a tangent to the gradient direction at each of the plurality of locations.

7. The method of claim 6 wherein (d) comprises detecting the border as the connected locations where the tangents are about perpendicular to the gradient directions along the border.

8. The method of claim 5 further comprising:
   (e) receiving an indication of a region of interest;
   wherein (b) comprises determining the initial boundary as a function of image intensity and the indication; and
   wherein (d) is performed as a function of the initial boundary.

9. The method of claim 5 further comprising:
   (e) minimizing a cost of a cost function as a function of the gradient direction and the border direction for each of the plurality of locations;
   wherein (d) comprises selecting the connected locations corresponding to the minimum cost.

10. The method of claim 9 wherein (e) comprises calculating cost multiple times for each of the plurality of locations, the calculating for each of the multiple times being a function of different possible border directions;
  wherein the cost for each of the plurality of locations is selected as the minimum of the multiple calculations for a given location.

11. The method of claim 5 wherein the medical image comprises a longitudinal vessel view, (a) comprises determining the gradient direction for each of a plurality of locations in a region of interest, and (c) comprises identifying a border direction for each of the plurality of locations in the region of interest, the border direction being selected as a function of calculations for a plurality of possible border directions for each location.

12. The method of claim 5 wherein the medical image comprises a cross-sectional vessel view, (a) comprises determining the gradient direction for each of a plurality of locations along an edge of a geometric shape approximating the cross-section of the vessel, (c) comprises identifying the border direction as the tangent to the geometric shape at each of the plurality of locations.

13. The method of claim 12 further comprising:
  (e) minimizing a cost of a cost function in response to different parameters defining the geometric shape, the cost function being a function of the gradient direction and the tangent for each of the plurality of locations; and
  (f) determining a different parameter of the geometric shape for the minimization of (e) as a function of the image intensity;
  wherein (d) comprises selecting a final geometric shape as a function of the parameters corresponding to a minimum cost.

14. The method of claim 12 wherein (d) comprises:
  (d1) altering the geometric shape as a function of the tangent and the gradient direction; and
  (d2) selecting a final geometric shape from the altered geometric shapes;
  further comprising:
  (e) determining a vessel diameter as a function of the final geometric shape.

15. A method for detecting a border in a medical image, the method comprising:

(a) determining a gradient for a plurality of locations in the image; and
  (b) identifying at least a line segment in response to a tangent to the line segment, the tangent substantially perpendicular to a direction of the gradient for each location of the plurality of locations along the line segment.

16. The method of claim 15 wherein (b) comprises:
  (b1) calculating a minimum cost for each of the plurality of locations, the minimum cost for each location being a function of the tangent at the location and the direction of the gradient for the location; and
  (b2) selecting the line segment as adjacent locations with a minimum sum of the minimum costs.

17. The method of claim 15 wherein (b) comprises identifying a closed geometric form.

18. The method of claim 15 wherein (b) comprises identifying a line without connected ends.

19. A system for detecting a border in a medical image, the system comprising:
  a memory operable to store the medical image; and
  a processor operable to determine a gradient direction for each of a plurality of locations in the image, identify a border direction relative to the gradient direction for the plurality of locations, and detect the border as connected locations of the plurality of locations, the detecting being a function of the gradient direction and the border direction.

20. The system of claim 19 further comprising:
  a user input device, wherein the processor is operable to determine an initial boundary in response to user input with the user input device.

21. The system of claim 19 wherein the processor is operable to minimize a cost of a cost function as a function of the gradient direction and the border direction for each of the plurality of locations and select the connected locations corresponding to the minimum cost functions.

22. The system of claim 19 wherein the processor is operable to identify a closed geometric form as the border.

23. The system of claim 19 wherein the processor is operable to identify a line without connected ends as the border.

* * * * *